United States Patent [19]

Perry

[11] Patent Number: 4,851,943
[45] Date of Patent: Jul. 25, 1989

[54] DISK DRIVE ASSEMBLY TOOL

[75] Inventor: Donald S. Perry, Saratoga, Calif.

[73] Assignee: Maxtor, San Jose, Calif.

[21] Appl. No.: 171,227

[22] Filed: Mar. 21, 1988

Related U.S. Application Data

[63] Continuation of Ser. No. 879,279, Jun. 27, 1984, abandoned.

[51] Int. Cl.$^4$ .............................................. G11B 5/54
[52] U.S. Cl. .................................... 360/105; 360/128
[58] Field of Search .............. 360/137, 104, 105, 109, 360/98, 102, 103, 128

[56] References Cited

U.S. PATENT DOCUMENTS

| | | | |
|---|---|---|---|
| 3,702,997 | 11/1972 | Jamieson | 360/105 X |
| 4,392,165 | 7/1983 | Wright | 360/104 X |
| 4,644,429 | 2/1987 | Boe | 360/103 X |

FOREIGN PATENT DOCUMENTS

1119071  10/1984  U.S.S.R. .............................. 360/103

Primary Examiner—Robert S. Tupper
Assistant Examiner—Andrew L. Sniezek
Attorney, Agent, or Firm—Hecker & Harriman

[57] ABSTRACT

An improved head loader is disclosed for use in assembling hard disk drives to permit the placement of magnetic heads over desired tracks of the magnetic disks. The loader includes a main frame, through which is disposed a shaft. The shaft passes through the frame and is secured to a positioning piece which includes an upwardly extending guide pin, and a downwardly extending positioning pin. A guide piece having a plurality of guides is rigidly attached to the frame. In operation, spreading blades pass through the guides and separate the magnetic heads on an actuator arm to permit the movement of the actuator arm to a position over desired areas of the magnetic disks, without the magnetic heads contacting the disks and causing damage. The loader is configured such that a user inserts the positioning pin through concentric holes in the actuator arm, and places a nub which is the remaining portion of the shaft passing through the positioning piece, into another triangular orifice in the uppermost arm comprising the actuator arm. The user first swings the loader into place by pressing against the handle maintaining his grip on the handle and then rotating it. The spreading blades are then forced through the guide over a nylon roller such that they diverge at an angle. The structure of the present invention is such that once properly positioned, the diverging blades contact flexible arms carrying the magnetic heads on the actuator arm. The blades force adjacent flexible arms to come in contact with one another, and thereby spread the magnetic heads. The assembler may then rotate the actuator arm until the magnetic heads are disposed over a desired position on the magnetic disks. By counterrotating the handle, the spreading blades are retracted back into the guides and the loader is returned to its initial position, such that it can be removed from the actuator arm.

4 Claims, 6 Drawing Sheets

DISK DRIVE ASSEMBLY TOOL

This is a continuation of application Ser. No. 879,279 filed 06/27/84 now abandoned.

BACKGROUND OF THE INVENTION

1. Field of the Invention

The present invention relates to improvements in the mechanical assembly of a hard disk drive, and more particularly, to the placement of a plurality of magnetic heads over corresponding hard disks during fabrication of the disk drive.

2. Art Background

Winchester disk drives have been used in the computer industry for many years. The disks are generally rotated by a spindle driven by a spindle motor. Typically, the motor driving the spindle shaft is located below the shaft or incorporated in the spindle hub. The magnetic heads of the hard disk drive are typically mounted on arms either of a linear movement type or a pivotal movement type. During assembly, a plurality of hard disks are mounted on the spindle or other drive mechanism and the corresponding magnetic heads must be positioned over an appropriate track on each magnetic disk.

In the present invention, a plurality of "Whitney" type heads are disposed on an actuator arm which pivots permitting the heads to "fly" over desired tracks on the hard disks. Each head flies on a very thin layer of air over the disk surface. Any contamination which disrupts this air flow will cause the head to cease flying and drag on the disk instead, thereby causing damage and a loss of data. During assembly of the disk drive, it is critical that the heads be lowered into contact very gently to prevent damage to the hard disk until it is powered up and the heads begin to fly.

As will be described, the present invention relates to an improved hard disk head loader which permits the placement of magnetic heads on desired areas of a hard disk in an efficient manner, with minimal risk of damage to the magnetic media during assembly of the disk drive.

SUMMARY OF THE INVENTION

An improved head loader is disclosed for use in assembling hard disk drives to permit the placement of magnetic heads over desired tracks of the magnetic disks. The loader includes a main frame, through which is disposed a shaft. The shaft passes through the frame and is secured to a positioning piece which includes an upwardly extending guide pin, and a downwardly extending positioning pin. A guide piece having a plurality of guides is rigidly attached to the frame. In operation, spreading blades pass through the guides and separate the magnetic heads on an actuator arm to permit the movement of the actuator arm to a position over desired areas of the magnetic disks, without the magnetic heads contacting the disks and causing damage. The loader is configured such that a user inserts the positioning pin through concentric holes in the actuator arm, and places a nub which is the remaining portion of the shaft passing through the positioning piece, into another triangular orifice in the uppermost arm comprising the actuator arm. By turning a handle on the loader, the spreading blades are forced through the guide over a nylon roller such that they diverge at an angle. The structure of the present invention is such that once properly positioned, the diverging blades contact flexible arms carrying the magnetic heads on the actuator arm. The blades force adjacent flexible arms to come in contact with one another, and thereby spread the magnetic heads. The assembler may then rotate the actuator arm until the magnetic heads are disposed over a desired position on the magnetic disks. By counterrotating the handle, the spreading blades are retracted back into the guides and the loader is returned to its initial position, such that it can be removed from the actuator arm.

DETAILED DESCRIPTION OF THE INVENTION

An improved head loader is disclosed for use in assembling hard disk drives to permit the placement of magnetic heads over desired tracks of the magnetic disks. In the following description, for purposes of explanation, numerous details are set forth such as specific appliance configurations, materials, structures, etc. in order to provide a thorough understanding of the present invention. However, it will be apparent to one skilled in the art that the invention may be practiced without these specific details. In other instances, well known components, structures, disk drive mechanisms, and magnetic media have not been described in detail in order not to obscure the present invention unnecessarily.

Figure 1:
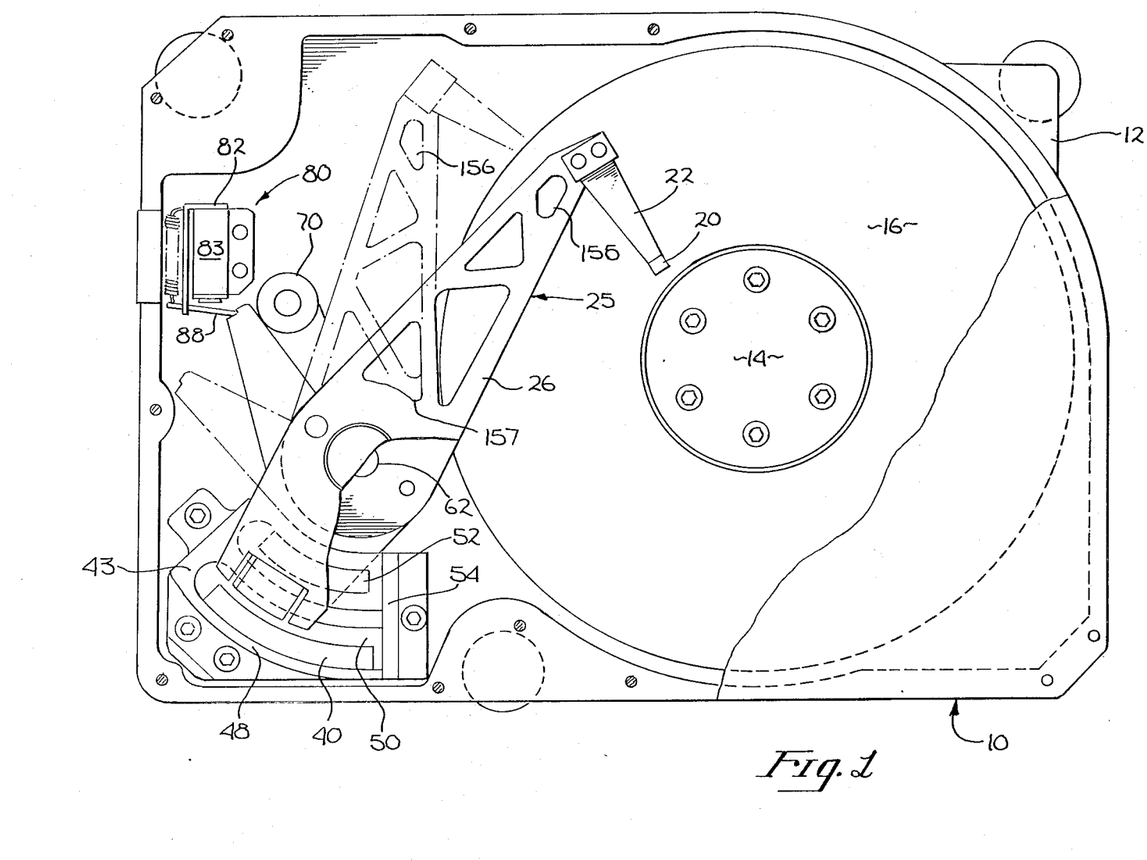
FIG. 1 is a top plan view of a hard disk drive illustrating the actuator arm's movement over a magnetic disk.

Referring to FIG. 1, a typical hard disk drive manufactured by the Assignee of the present invention is disclosed. The drive identified generally by the numeral 10 includes a unitary base 12 which is hereinafter described as being on the bottom of the device, it being understood that the eventual mounting of the device in the equipment may result in the base 12 being horizontal, vertical or in other positions. Typically, a circuit board containing electrical components is secured below base 12. A motor (not shown) drives a central cylinder 14 on which a plurality of magnetic disks 16 are disposed in a planar fashion. Inasmuch as FIG. 1 illustrates a top view of the disk drive 10, only the upper magnetic disk 16 is illustrated. However, as shown best in FIGS. 5, 7 and 9, a plurality of magnetic disks 16 are coupled to the cylinder 14 in a parallel fashion and are rotated, as is well known in the art, via rotation of cylinder 14 by the motor. In the present embodiment, cylinder 14 is coupled to an interior spindle with an integrated motor assembly as disclosed in U.S. patent application Ser. No. 06/444,465, filed Nov. 24, 1982, entitled "Winchester Disk Drive Structure", and assigned to the Assignee of the present invention.

For each surface of each disk 16 there is a magnetic head 20 supported on the outer end of a flexible arm 22. The heads 20 are actuated by means hereafter explained, to magnetically engage recording tracks on both surfaces of each of the disks 16, the heads moving between the outer periphery of the disks just adjacent to the edge of cylinder 14. Inner positions of the heads 20 are shown in solid lines in FIG. 1 and the outer position is shown in phantom lines.

Figure 3:
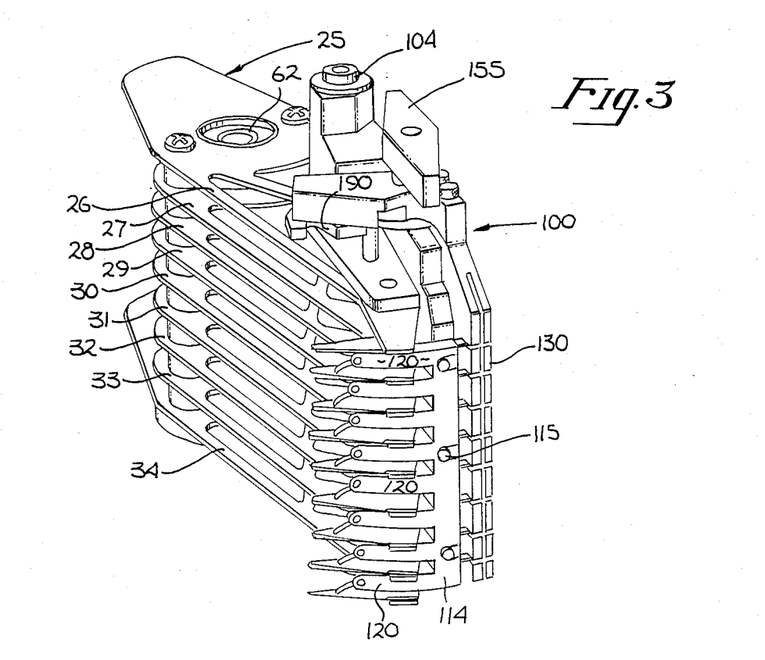
FIG. 3 is a perspective view of the placement of the present invention in the actuator arm during fabrication of the disk drive.

Heads 20 are supported and moved by an actuator arm 25 comprising a plurality of parallel arms (see FIGS. 1 and 3). The uppermost head 20 which engages the recording tracks on the top surface of the uppermost disk 16 is supported by a top arm 26. The lowermost head 20 which reads the recording tracks on the bottom surface of the lowermost disk 16 is supported by a bottom arm 34 (see FIG. 3). Accordingly, there are, for eight disks 16 shown in FIGS. 5, 7 and 9, seven intermediate arms (27-33) each carrying two flexible arms 22 carrying heads 20, which engage the undersurface of one disk and the top surface of the next lowermost disk, as illustrated in the drawings (see FIG. 5). The actuator arm 25 is mounted for oscillatory movement about pivot shaft 62 which fits into a hub on the bottom of base 12. Surrounding the pivot shaft 62 is a hollow cylinder with bearings interposed between the shaft and the cylinder.

Mounted in the corner of the base 12 is a "voice coil" motor 40 (see FIG. 1) which actuates the actuator arm 25. Fastened to base 12 is a motor frame consisting of a vertical radial member 43 from which projects vertical outer pole 48 and intermediate or center pole 50 and an inner pole 52, each of which are arcuate in shape, having its inner and outer radii concentric with pivot shaft 62. The poles 48, 50 and 52 are radially spaced apart. The ends of the poles opposite member 43 are closed off by end piece 54, which greatly improves the flux carrying capability, thereby reducing centerpole projected area and wasted coil length. The winding consists of a vertically elongated coil of wire which straddles the center pole 50. The winding is formed around a mandrel (not shown and removed after manufacture of the coil) and permanently held in position having relatively square top and bottom and elongated sides. The passage of electric current through the windings in cooperation with the magnetic flux of the magnets causes the winding to provide force in an arcuate path along the center pole, and, in turn, causes the actuator arm 25 to rotate about pivot shaft 62.

Attached to base 12 is a resilient overtravel bumper 70. Bumper 70 limits the rotary movement of actuator arm 25 so that the heads 20 traverse only the portions of the disks 16 which carry recording tracks. Latch 80 is provided to hold the arm 25 stationary during storage, or preferably, at any time when power to the device is off. A frame 82 is attached to base 12 carrying an electromagnetic coil 83. Pivoted to the frame 82 is a clapper 86 held in outward position by a spring. The bottom arm 34 of the actuator arm 25 is formed with a notch 88 in which the outer end of the clapper 86 fits when the coil 83 is deenergized, preventing movement of the arms. When the power is on, the coil 83 is energized retracting the clapper 86 so that it disengages the notch 88 thereby permitting the actuator arm 25 to rotate under the influence of the motor 40 driving the actuator arm.

Alternatively, an actuator lock 101 (shown in FIGS. 6 and 8 and later discussed with reference to same), may be used in place of latch 6 and 8. The actuator lock similarly prevents movement of the arm 25.

The structure of the disk drive disclosed in FIG. 1 defines the corresponding elements of the drive once assembled. However, the placement of heads 20 on each disk 16 is critical during assembly. Since during disk drive operation the heads 20 "fly" over each surface of the disks 16, the heads never physically contact the disk surface. Such physical contact may severely damage the magnetic media causing loss of data. Since disks 16 are not rotated during assembly of the drive, the heads 20 must be physically separated during head loading to assure that rotation of the actuator arm assembly does not result in the heads contacting the disks. As will be described below, the present invention provides a unique head loader device which separates heads 20 and permits the rotation of the actuator arm assembly to the head loading position.

Figure 2:
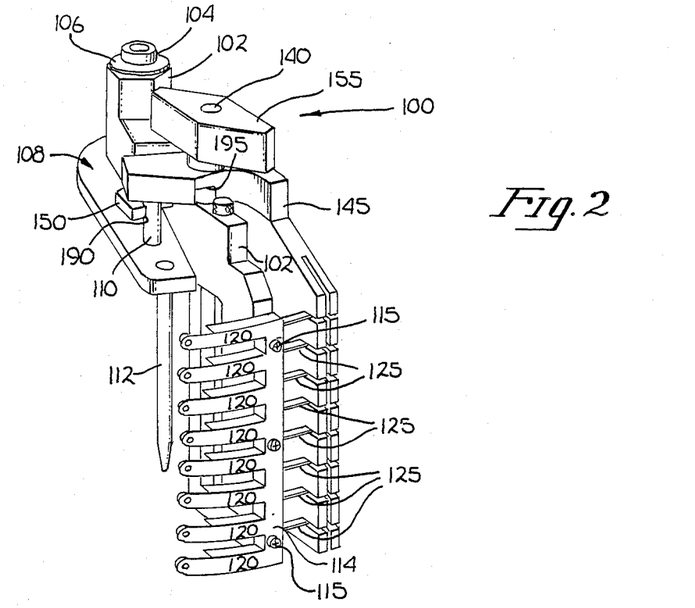
FIG. 2 is a perspective view of the present invention's head loader.

Referring to FIG. 2, the head loader of the present invention is illustrated and referred to generally by the numeral 100. Loader 100 includes a main frame 102 through which is disposed a shaft 104 retained by a retaining ring 106. Shaft 104 passes through the frame 102, as shown, and is secured to a positioning piece 108. A nub 109 (see FIGS. 4, 6 and 8) comprises the extension of shaft 104 passing through and below positioning piece 108. As illustrated in FIGS. 2 and 3, positioning piece 108 includes an upwardly extending guide pin 110 secured to the piece 108, and a downwardly extending positioning pin 112 similarly secured to piece 108. Positioning piece 108 is free to rotate about the axis of the shaft 104.

Frame 102 further includes a guide piece 114, which, as will be described, guides spreading blades 125 which separate the magnetic heads 20 permitting the movement of the actuator arm 25 to a position over desired areas of the magnetic disks 16. As illustrated, guide piece 114 is secured to the frame 102 by three aligned head screws 115, and includes a plurality of guides 120. Spreading blades 125 are secured to loader 100 by moving member 130. In the present embodiment, two blades 125 are provided for each guide 120. As illustrated, member 130 is coupled to frame 102 by a central shaft 140 which passes through frame 102, an L-shaped limiter 145 of moving member 130, as well as a locking piece 150. A handle 155 is coupled to shaft 140, which, as will be described more fully below, forces blades 125 through guide channels 120 in a fashion to spread heads 20. As will be evident, an assembler inserts loader 100 into actuator arm 25 and proceeds to swing handle 155 in an arc. The swinging of handle 155 causes entry of the loader into the actuator arm 25, then rotation forces moving member 130 toward channels 120, and thereby forces blades 125 through the respective channel wherein they are diverged to spread the heads 20.

During assembly of disk drive 10, an operator inserts positioning pin 112 of loader 100 through a series of concentrically arranged holes 156 disposed in the forward end of each arm comprising the actuator arm 25 (see FIGS. 1, 4, 6 and 8). Nub 109 of shaft 104 is similarly inserted into a triangular hole 157 through arm 26. Accordingly, loader 100 is prevented from movement once positioned on the actuator arm as described above. FIG. 3 illustrates the position of the loader 100 on actuator arm 25.

Figure 4:
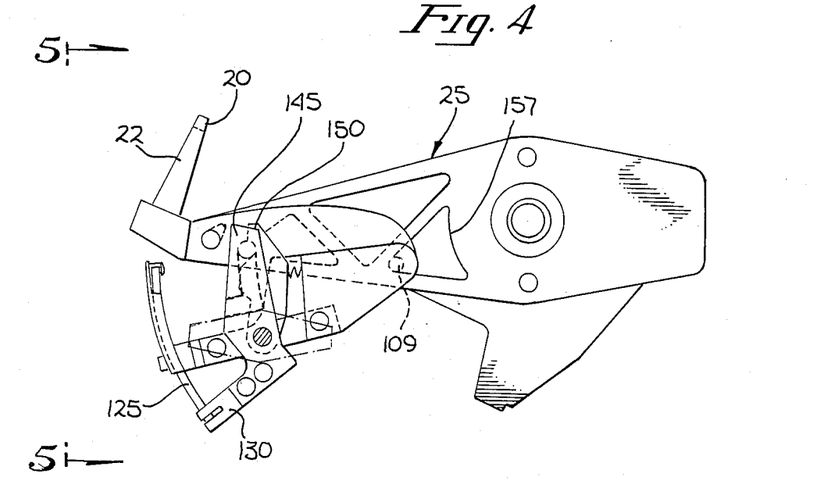
FIG. 4 is a top view of the actuator arm illustrating the initial placement of the present invention.
Figure 5:
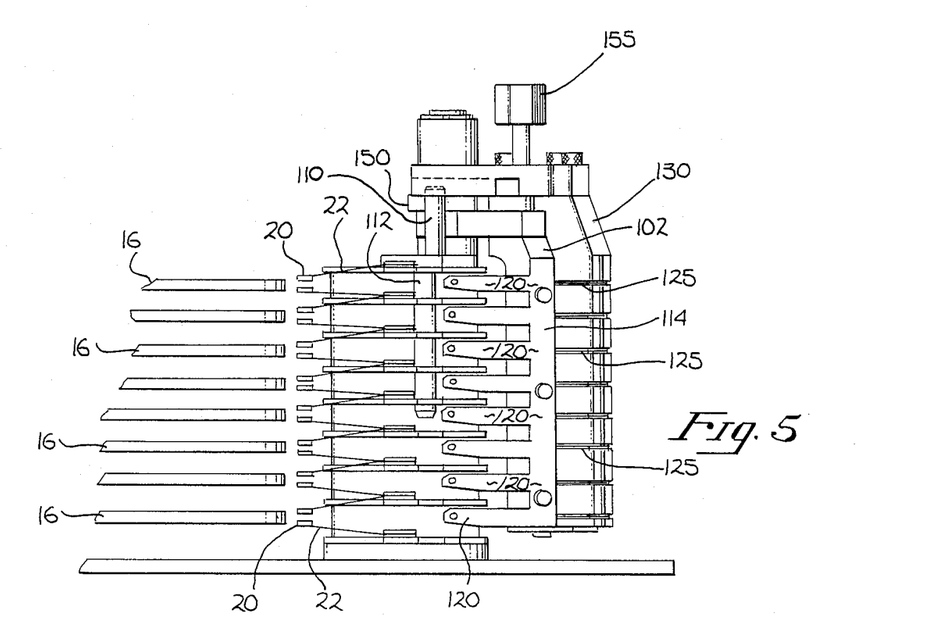
FIG. 5 is a front view of the present invention after initial placement on the actuator arm.

Referring now to FIGS. 4 and 5, the initial position of head loader 100 once placed on the actuator arm 25 is illustrated. As best shown in FIG. 5, each flexible arm 22 is fixed to the arms of the actuator arm 25 such that the flexible arms 22 diverge at an angle from the point at which they are fixed. Except for arms 26 and 34, each intermediate arm comprising actuator arm 25 includes two flexible arms 22, each flexible arm carrying a head 20, as shown in FIG. 5. It will be appreciated by one skilled in the art that actuator arm 25 may not be rotated toward the disk 16 when heads 20 are in the position illustrated in FIG. 5, since to do so would result in the heads contacting the disks' surfaces. Moreover, it will be noted from the drawings that each guide 120 of loader 100 is disposed between the arms comprising actuator arm 25. FIG. 4 illustrates the initial position of loader 100 corresponding to that illustrated in FIG. 5.

Figure 6:
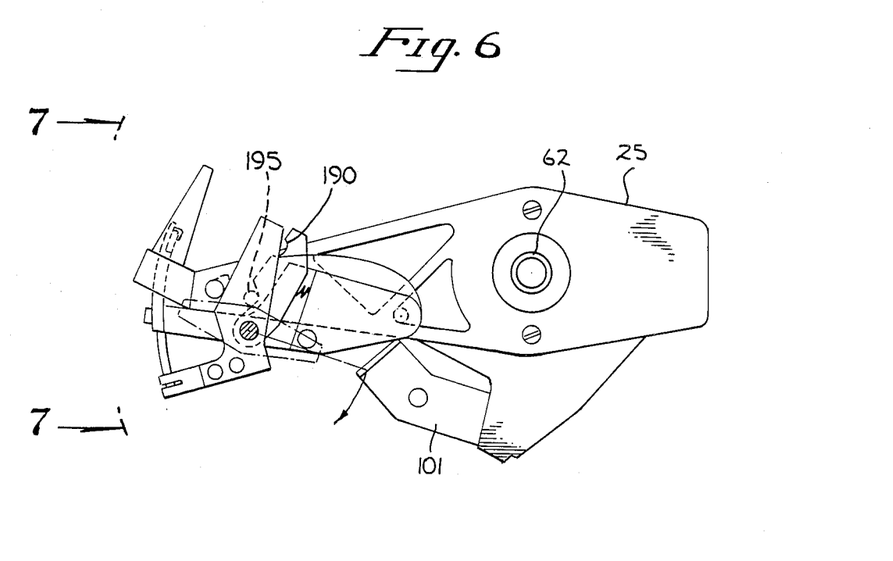
FIG. 6 is a top view of the actuator arm illustrating the initial movement of invention.
Figure 7:
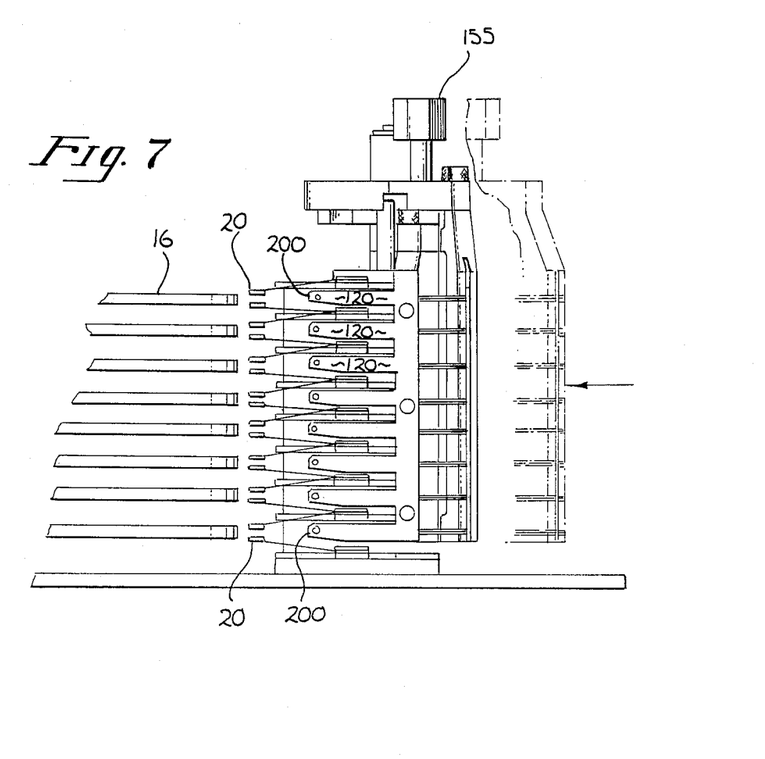
FIG. 7 is a front view of the present invention illustrating its position on the actuator arm after the initial movement.

Referring now to FIGS. 6 and 7, the position of loader 100 is illustrated subsequent to the initial movement by the operator of handle 155. The rotation of handle 155 results in the rotation of frame 102, and moving member 130 about the axis of shaft 104. Frame 102 and moving member 130 move as a set at this time with no relative motion between the two. Also, L-shaped limiter 145 has an L-shaped track disposed on the surface facing guide pin 110 (as shown in phantom lines of FIG. 4). Since positioning piece 108 is fixed on the actuator arm 25, rotation of handle 155 results in rotation of all other elements of loader 100 toward the positioning piece 108. As handle 155 is rotated, the L-shaped track of L-shaped member 145 slides across the top portion of guide pin 110 until guide pin 110 abuts the end of the L-shaped track of moving member 145. Thus, determining the arc of rotation of moving member 130. As best illustrated in FIGS. 3 and 6, piece 150 includes two notches 190 and 195. Generally, upwardly extending guide pin 110 is disposed in notch 190 as shown in FIG. 2. Piece 150 is biased by a small spring (not shown) away from frame 102 so as to provide a snap action. Upon rotation of handle 155, the corresponding rotation of frame 102 and member 130 forces compression of the spring and a repositioning of guide pin 110 into notch 195 in a snap action. The position of loader 100 after rotation of handle 155 is illustrated in FIGS. 6 and 7. It will be noted that guides 120 are now positioned such that their ends 200 extend between flexible arms 22. At this point, it will be appreciated that loader 100 is simply being mechanically positioned on actuator arm 25, and that the position of magnetic heads 20 has not been affected. FIG. 7 illustrates the before and after position for moving member 130 as a result of rotation of handle 155.

Figures 8, 9:
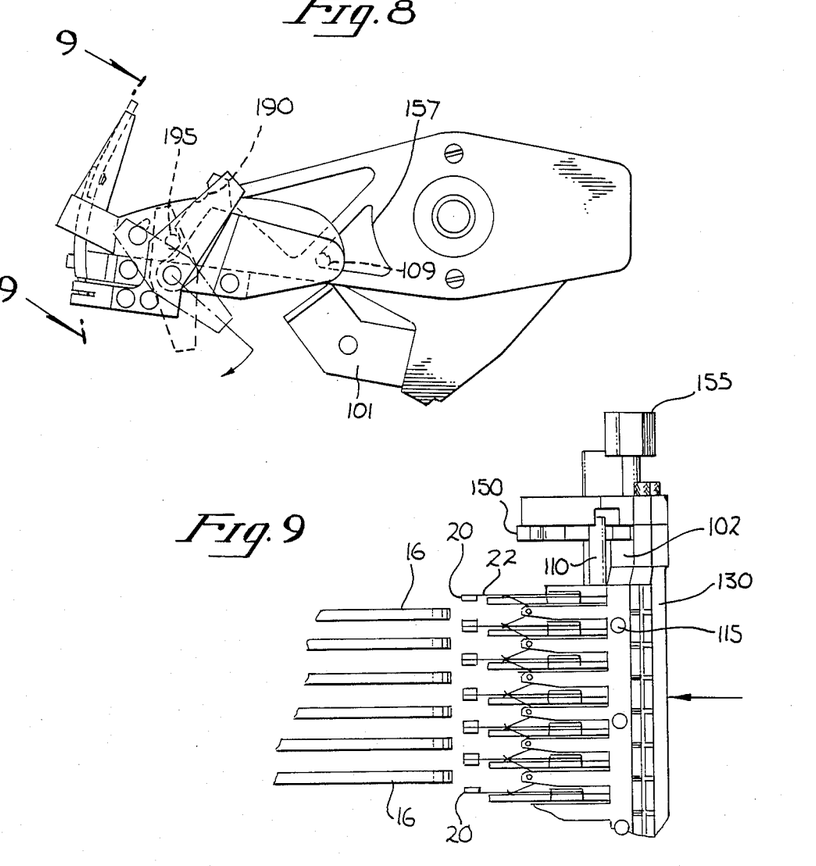
FIG. 8 is a top view as illustrated in FIG. 6 disclosing the final movement of the present invention to spread the magnetic heads.
FIG. 9 is a side view illustrating the position of the magnetic heads after the final movement of the present invention.
Figure 10:
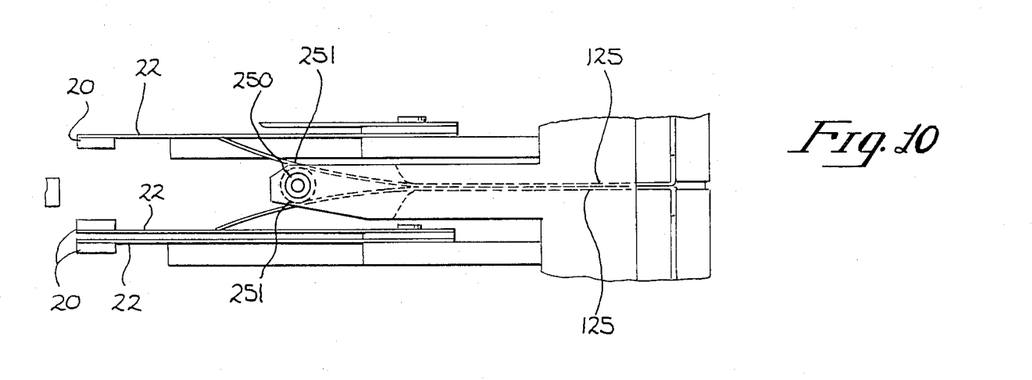
FIG. 10 is a side view illustrating the mechanism of the present invention to spread the magnetic heads.

Referring now to FIGS. 8, 9 and 10, the final movement of the loader 100 in order to spread magnetic heads 20 is disclosed. Further rotation of handle 155 results in movement of moving member 130 toward actuator arm 25. Further movement of frame 102 is prohibited since in the position illustrated in FIGS. 5, 8 and 9, frame 102 is adjacent and abutting positioning piece 108 and actuator arm 25. The movement of moving member 130 toward arm 25 forces blades 125 to pass through channels 120. As shown in FIG. 10, blades 125 are generally disposed within each guide 120, such that they diverge an angle $\Theta$ and rest on a nylon roller 250 at tangential points identified by the numeral 251. Forcing blades 125 further through guide 120 results in a further divergence of the blades 125 relative to one another as a result of passing over roller 250. The extention of blades 125 results in the blades passing out of guide 120 into physical contact with the flexible arms 22. As best illustrated in FIG. 9, the extension of blades 125 forces adjacent flexible arms 22 to contact one another, thereby spreading magnetic heads 20.

Figure 11:
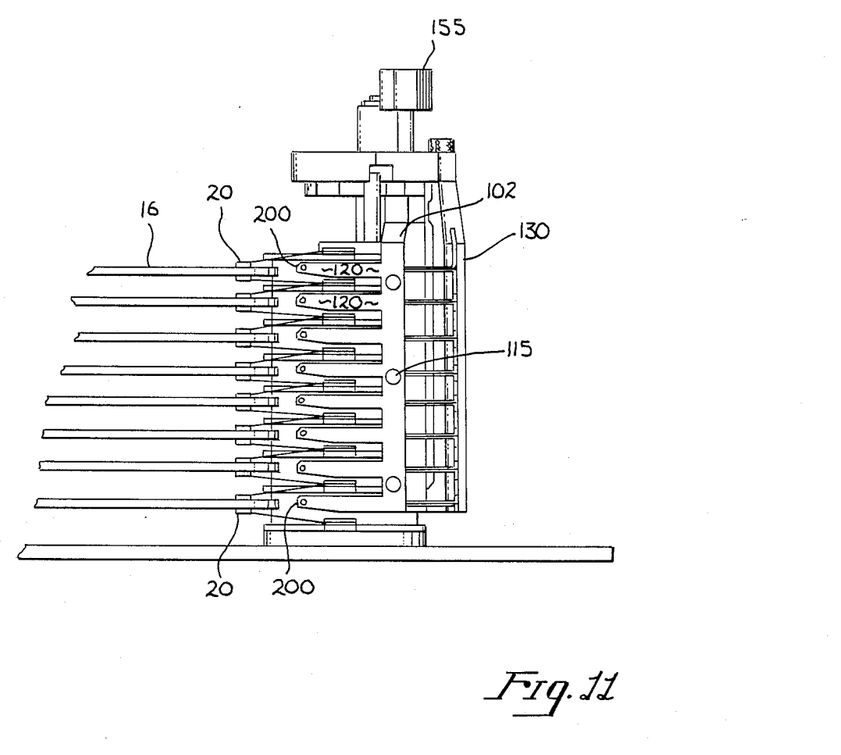
FIG. 11 is a side view illustrating the heads released to contact the disks.

Once heads 20 have been spread using loader 100, actuator arm 25 may be rotated and the heads 20 placed over a desired track area of the magnetic disks 16. As shown in FIGS. 6 and 8, once actuator arm 25 is properly positioned, the assembler installs an actuator lock 101 to rigidly retain actuator arm 25 in such position. The assembler then counterrotates handle 155 to retract blades 125 and permit the heads to be naturally supported by disks 16 as shown in FIG. 11. Loader 100 may then be removed by further counterrotation of handle 155 to the initial position illustrated in FIG. 4. The loader may then be simply lifted off of actuator arm 25, and the further assembly of the disk drive resumed.

Accordingly, an improved head loader has been disclosed for use in assembling hard disk drives to permit the placement of magnetic heads over desired tracks of the magnetic disks. Although the invention has been illustrated and described with reference to FIGS. 1 through 10, it will be appreciated that the Figures are for illustration only, and that the present invention may be used in other applications.

I claim:

1. A device for lifting magnetic heads disposed on flexible arms of a movable actuator assembly of a disk drive, said disk drive having a plurality of disks, said device comprising:

a main frame and a means for removably mounting said frame on said assembly;

lifting means for lifting said magnetic heads away from said disks;

positioning means for positioning said lifting means adjacent to said flexible arms, said positioning means being moveably attached to said frame and comprising a plurality of guides adopted to fit between said disks, such that there is at least one guide between each adjacent pair of disks, and a roller disposed in each of said guides;

said lifting means comprising flexible blades, said blades being disposed within said guides such that there is at least one flexible blade disposed over said roller within each of said guides;

movement means coupled to said positioning means, said movement means including a rigid member coupled to said flexible blades, said movement means for moving said guides adjacent to said flexible arms, and for moving said rigid member, said rigid member in turn extending said blades through said guides such that said blades exit said guides, contact said flexible arms, and lift said heads away from said disks.

2. The device as defined by claim 1, including a first shaft passing through said main frame, said shaft secured to a positioning piece, so as to form a nub; said positioning piece being free to rotate about said first shaft, said positioning piece including an upwardly extending guide pin and a downwardly extending positioning pin.

3. The device as defined by claim 2, including a second shaft passing through said frame and an end of said movement means, such that said movement means rotates with and about said second shaft, and further including a handle attached to said second shaft for moving said movement means, the rotation of said handle forcing said movement means toward said guides, forcing said flexible blades through said guides.

4. The device as defined by claim 3, wherein said actuator assembly includes a plurality of actuator arms having a first series of concentrically arranged holes formed therein for receiving said positioning pin and a second series of concentrically arranged holes formed therein for receiving said nub, thereby preventing rotation of said position piece and securing said device on said actuator arm.

* * * * *

UNITED STATES PATENT AND TRADEMARK OFFICE
CERTIFICATE OF CORRECTION

PATENT NO. : 4,851,943                          Page 1 of 2

DATED : July 25, 1989

INVENTOR(S) : Donald S. Perry

It is certified that error appears in the above-identified patent and that said Letters Patent is hereby corrected as shown below:

```
Title page, item [63] "Related U.S. Application Data"
          "Jun. 27, 1984" should read --Jun. 27, 1986--.
     In column 1, line 5, "6/27/84" should read --6/27/86--.
     In column 2, line 26, after "movement of", insert --the present--.
     In column 4, line 12, after "latch", delete "6 and 8" and
          insert in place thereof --80--;
          line 46, "permiting" should read --permitting--.
     In column 5, lines 41-42, "145. Thus, determining" should read
          --145, thus, determining--.
     In column 6, line 32, delete "10", and insert in place thereof
          --11--.
     In claim 1, line 11, "moveably" should read --movably--.
     In claim 3, line 7, after "guides", insert --thereby--.
     In claim 4, line 7, "position" should read --positioning--.
     In sheet 1 of the drawings, Fig. 1 should include reference number 86
          directed to the clapper of latch 80, and Fig. 1 should also
          include reference number 88 directed to the notch in which
          clapper 86 is engaged.  (See the attached revised drawing
          of Fig. 1.)
```

Signed and Sealed this

Thirtieth Day of March, 1993

*Attest:*

STEPHEN G. KUNIN

*Attesting Officer*           *Acting Commissioner of Patents and Trademarks*

Fig. 1